Figure 1:

United States Patent Office 3,286,009
Patented Nov. 15, 1966

3,286,009
METHOD OF IMPROVING THE SURFACE PROPERTIES OF POLYPROPYLENE FILM
Hirosuke Yumoto, Takeshi Hashimoto, Shinji Tanaka, Tamotsu Ito, Yasuhiro Kojima, Yoshinobu Shibata, Takuo Adachi, Yutaka Morita, and Tsutomu Ebihara, all of Shizuoka-ken, Japan, assignors to Toyo Rayon Kabushiki Kaisha, Tokyo, Japan, a corporation of Japan
Filed July 18, 1963, Ser. No. 296,125
Claims priority, application Japan, July 18, 1962, 37/29,290; July 30, 1962, 37/32,106; Aug. 28, 1962, 37/35,654; Oct. 2, 1962, 37/42,678; Nov. 27, 1962, 37/52,060; Dec. 19, 1962, 37/57,632; Dec. 27, 1962, 37/57,947; Dec. 28, 1962, 37/59,196, 37/59,198, 37/59,199
7 Claims. (Cl. 264—129)

This invention relates to a method of improving the surface properties of a polypropylene film, and in particular it is directed to a method which comprises improving the surface adhesive activity of a polypropylene film without impairing the desirable qualities inherent therein and further, if necessary, applying various surface reforming materials to the surface of this polypropylene film whose surface adhesive activity has been markedly improved to thereby produce a film whose surface properties have been greatly improved over that of the conventional polypropylene or predominantly polypropylene film and these films the surfaces of which have been treated by oxidation.

More specifically, the invention relates to (1) a method of improving the surface properties of a polypropylene film which comprises first stretching the film biaxially to orient the film until its planar orientation index is not less than about $2 \times 10^{-3}$ and its axial orientation index is not over about $10 \times 10^{-3}$, and then subjecting one or both surfaces of the film to an oxidation treatment to impart a markedly improved surface adhesive activity; and (2) a method of improving the surface properties of the foregoing film which comprises applying further to said surface adhesive activated film various surfaces reforming materials whereby it can be imparted to the film qualities such as greatly improved adhesion, antistatic property, heat-sealability, gas impermeability, printability, suitability for metallizing by vacuum deposition, etc., without impairment of the desirable qualities possessed by polypropylene film, such as its transparency, toughness, heat resistance, etc.

Although polypropylene film has many desirable qualities, as stated above, when compared with the other synthetic polymer films, its surface, on the other hand, is highly inert. Hence, in order to overcome the shortcomings of polypropylene film such as its lack of gas-intercepting property important for food packing its static property and contaminable property incident thereto, attempts have been made in the past to apply a suitable reforming material to the surface of the film by such means as coating, laminating, vapor deposition, that is, vacuum deposition, etc. However, these efforts have been to no avail in improving the surface properties to a satisfactory degree because of the essential lack of a surface adhesive activity on the part of the film.

Consequently, notwithstanding the many desirable qualities possessed by this film, its utility is drastically restricted. Hence, it has been very difficult to provide films such as those which are wholly satisfactory in making laminated films adhered with binding agents, coated films, gas impermeable films for preservation of aroma and prevention of deterioration of packed contents, films which are capable of being printed, films which can be heat-sealed, non-static films for automatic packaging, metalized films, etc.

It is known hitherto to reform the surface properties of the various classes of thermoplastic resin films by coating their surface with various other classes of synthetic resins. However, as already stated above, in the case of a polypropylene film, because of its essentially inert surface, particularly its lack of surface adhesive activity, even though such a technique is practiced, it is obvious that only unsatisfactory results could be expected.

Further, for improving such a surface inertness and imparting adhesive activity to such a surface, it is also known to subject the surface of a polypropylene film to an oxidation treatment, after which treatment a coating of resin is applied. However, in the case of the film obtained by this treatment, the desirable qualities which are inherently possessed by the polypropylene film are impaired considerably in that not only its strength and transparency decrease, but also a decrease in its strength with the passage of time takes place, which in extreme cases is such that its practical usefulness is lost. Furthermore, the adhesion between the polypropylene film and the coating is also utterly unsatisfactory.

As a result of our researches for overcoming the essential lack of the surface adhesive activity of the polypropylene film, as hereinbefore mentioned, without impairing the desirable qualities possessed by this film, we found that in the conventional films whose surfaces have been subjected to an oxidation treatment, the surfaces were eroded considerably in a heterogeneous manner to form a rough surface which makes adhesion with other materials difficult. In addition, it was found that since the eroding action in the case of the film obtained by such a treatment would progress still further, it would result in a marked decrease in the strength of the film. We also found that there existed a very intimate relationship between the results of such an unsatisfactory oxidation treatment and the molecular orientation of the polypropylene film and that when the orientation of the film has been accomplished fully, the fault incident to the conventional surface oxidation treatment that the desirable qualities possessed inherently by the polypropylene film would be impaired could be satisfactorily surmounted. In addition, surprisingly, we found that by effecting the orientation of the film until the planar orientation index is not less than about $2 \times 10^{-3}$, and preferably not less than $5 \times 10^{-3}$, and the axial orientation index is not over about $10 \times 10^{-3}$, the effects of the oxidation treatment on the polypropylene film could be very strikingly enhanced to yield a film having very superior surface adhesive properties.

The planar orientation index and the axial orientation index, as used herein, denote the below-described birefringence as expressed by $\frac{1}{2}(\beta+\gamma)-\alpha$ and $\gamma-\beta$, respectively. Namely, an object having refractive indices intersecting perpendicularly with each other which difference is referred to as being biaxial, and its refractive indices are referred to in sequence, starting from the smallest and proceeding to the largest as $\alpha$, $\beta$ and $\gamma$. In the case of a plastic film stretched in the longitudinal and transverse directions, the refractive index in the direction of its thickness becomes $\alpha$, and the refractive indices which are normal to each other in the plane of the film become $\beta$ and $\gamma$, respectively. Therefore, $\gamma-\beta$ becomes the measure of the equilibrium of the longitudinal and transverse orientations (axial orientation) within the film plane, while $\frac{1}{2}(\beta+\gamma)-\alpha$ becomes the measure of the planar orientation of the film. The procedures for making these measurements are described in detail by R. S. Stein in the "Journal of Polymer Science" 24, 383–386 (1957).

When we furthered our researches concerning the fact that the conspicuous oxidation treatment effects such as could not possibly have been expected heretofore were produced only in such a polypropylene film which has been fully oriented so as to have a planar orientation index of above a specified value (needless to say, a value below that at which the film breaks) and an axial orientation index of below a specified value, it became apparent that the manner in which the oxidation treatment actions proceeded under identical oxidation treatment conditions differed essentially between the film which had been subjected to the oxidation treatment according to the method of this invention and that which did not have the specified orientation indices set forth above for the film of this invention. Whereas, according to the method of this invention, the actions of the oxidation treatment took place very homogeneously and orderly planewise from the surface, in the case of the polypropylene film which does not have such orientation indices, the oxidation treatment actions do not proceed planewise but proceeds very irregularly and haphazardly, with the consequence that when the treated surfaces of the two, after oxidation treatment, are compared, it was found that pronounced differences in their surface structures occurred. These facts will be described further with reference being had to the accompanying drawings.

Figure 2:
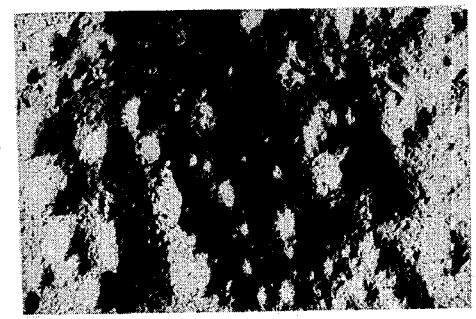
Figure 3:
Figure 4:
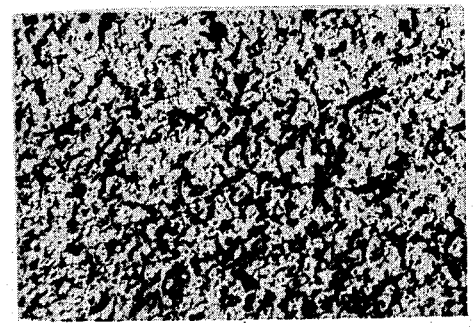

In the accompanying photographs which are atomic replica photographs magnified 108,000× by means of an electron microscope, FIG. 1 illustrates the surface of a polypropylene film having a planar orientation index of $6.0 \times 10^{-3}$ and an axial orientation of $3.6 \times 10^{-3}$, FIG. 2 showing the film surface after its oxidation treatment. On the other hand FIG. 3 shows the surface of a polypropylene film having a planar orientation index of $0.5 \times 10^{-3}$ and an axial orientation of $1.0 \times 10^{-3}$, which has been presented for purpose of comparison, FIG. 4 showing the film surface after its oxidation treatment. The oxidation treatment, in all instances, was by means of a sulfuric acid-potassium dichromate mixed liquor (99.0% sulfuric acid, 1.0% potassium dichromate) with the treatment given for 10 minutes and 90° C. As is apparent from the results of these replica photographs, it can be seen from FIGS. 1 and 2 that according to the present method, the actions of the surface oxidation treatment proceed very homogeneously planewise from the surface. In contrast, from FIGS. 3 and 4 it is seen that the actions of the oxidation treatment proceed very irregularly and haphazardly when the operation departs from the critical conditions of the method of the present invention.

Figure 5:
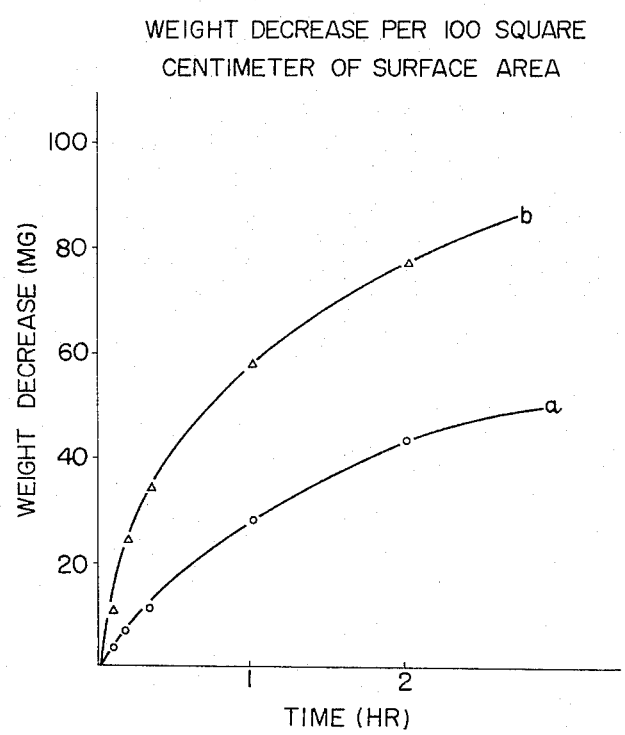

Further, in FIG. 5 are shown the weight decreases resulting from oxidation treatment of these films illustrated in FIGS. 1 and 2 and FIGS. 3–4, the weight decreases (mg./100 cm.²) being plotted on the axis of ordinates and the treatment time (hour), on the axis of abscissa. Curve $a$ is that of the film according to this invention shown in FIGS. 1 and 2, whereas curve $b$ is that of the control shown in FIGS. 3 and 4. As is apparent from FIG. 5, the tendency to the occurrence of a troublesome disintegration as a result of an oxidation treatment is greatly restrained according to the method of this invention. In contrast, it can be seen from the results of weight decreases in the case of the control that there occurred a very troublesome disintegration in the film.

The adhesive force of foregoing polypropylene films before their oxidation treatment (FIGS. 1 and 3) and after their oxidation treatment under identical conditions (FIGS. 2 and 4, respectively) were tested as follows: The adhesive force was judged by applying on top of the sample film a coating of thermoplastic resin and determining the magnitude of the force required to strip said coating from the sample film. The thermoplastic resin used was a copolymer consisting of vinyl chloride, vinyl acetate and maleic anhydride in a ratio of 7:30:05, which was dissolved in ethyl acetate to a concentration of 40%. This solution was brushed onto the sample in a thickness sufficient to give a 2-micron-thick coating when dried and then dried for 2 minutes at 70° C. An adhesive tape was applied to the coated surface, and the sample along with the adhesive tape was cut into strips 1 centimeter wide. If the adhesive tape is stripped, the coating will be stripped from the film surface. Thus, the adhesive force can be compared by means of the force required for the stripping at this time. Since the adhesive force of the adhesive tape itself is usually 100–200 g./cm. and is larger than the adhering force of the coating, the differences in the adhesive tape which affect the measurement results can be ignored. However, since the thickness of the adhesive tape affects the stripping force, care must be exercised. The adhesive tape that we used was a 40-micron-thick tape of cellophane base.

Following the foregoing procedures, tests were conducted of the adhesive forces (g./cm.) of coatings applied to samples while varying the times and temperatures of the oxidation treatments, the results of which are set forth in Table I, below.

TABLE I

| Oxidation Treatment Conditions | | Adhesive Force of Coating, g./cm. | |
|---|---|---|---|
| Temperature, °C. | Time, sec. | Sample B (Control) | Sample A (Present Invention) |
| Untreated | | 3 | 2 |
| 25 | 1 | 3 | 47 |
| 25 | 2 | 4 | 58 |
| 25 | 5 | 4 | 62 |
| 25 | 30 | 5 | 56 |
| 25 | 60 | 4 | 58 |
| 50 | 60 | 5 | 61 |
| 50 | 180 | 6 | 65 |
| 75 | 60 | 6 | 66 |
| 75 | 180 | 7 | 69 |
| 95 | 60 | 7 | 65 |
| 95 | 180 | 9 | 72 |

As is apparent from the results of Table I, above, whereas the polypropylene film according to the method of this invention (FIG. 2) exhibits a very high adhesive force which could not have been expected in the past, on the other hand, a polypropylene film such as the control (FIG. 4) showed only a very low adhesive force irrespective of the oxidation treatment conditions. Thus, it can be seen that the adhesive force subsequent to its oxidation treatment of sample A according to the present method has a strikingly high adhesive property, which even amounts to about 8 to 16 times that of sample B, the control.

The changes in the adhesive force incident to the changes in the firefringences $\gamma-\beta$ and $\frac{1}{2}(\beta+\gamma)-\alpha$ of polypropylene films when treated for 3 seconds at 30° C. with a mixed liquor consisting of 1500 parts of $H_2SO_4$, 75 parts of $K_2Cr_2O_7$ and 120 parts of $H_2O$ were measured, the results of which are shown in Table II, below.

TABLE II

| Axial Orientation Index, $\gamma-\beta$ | Planar Orientation Index, $\frac{1}{2}(\beta+\gamma)-\alpha$ | Adhesive Force, g./cm. |
|---|---|---|
| $1.0 \times 10^{-3}$ | $0.5 \times 10^{-3}$ | 3.7 |
| $1.1 \times 10^{-3}$ | $1.5 \times 10^{-3}$ | 4.1 |
| $1.4 \times 10^{-3}$ | $2.1 \times 10^{-3}$ | 64 |
| $3.0 \times 10^{-3}$ | $3.3 \times 10^{-3}$ | 62.5 |
| $3.3 \times 10^{-3}$ | $4.3 \times 10^{-3}$ | 65 |
| $3.6 \times 10^{-3}$ | $6.0 \times 10^{-3}$ | 62 |
| $4.7 \times 10^{-3}$ | $9.9 \times 10^{-3}$ | 66 |
| $8.0 \times 10^{-3}$ | $10.7 \times 10^{-3}$ | 58 |
| $13.0 \times 10^{-3}$ | $12.2 \times 10^{-3}$ | 3.5 |
| $22.0 \times 10^{-3}$ | $13.1 \times 10^{-3}$ | 3.6 |
| $27.0 \times 10^{-3}$ | $14.5 \times 10^{-3}$ | 2.2 |

As is apparent from the results of the foregoing Table II, there is observed a marked improvement in the surface adhesive activity by means of an oxidation treatment in the films whose planar orientation and axial orientation indices are values falling with the ranges specified by the present invention. On the other hand, it is seen that the adhesive force shows a marked decrease when either of these indices depart from their respective specified ranges. In the case of the planar orientation index, a value of above about $2 \times 10^{-3}$ is preferred, and from the standpoint of obtaining uniformity in the stretching operation, a value of above about $5 \times 10^{-3}$ is desired.

A printability test was also conducted, the films tested being a 280-micron-thick polypropylene film having a planar orientation index of $0.5 \times 10^{-3}$ and an axial orientation index of $1.0 \times 10^{-3}$ and a polypropylene film of the same width having a planar orientation index of $6.0 \times 10^{-3}$ and an axial orientation of $3.6 \times 10^{-3}$, the two films being subjected to oxidation treatments with a mixed liquor consisting of 99 parts by weight of 96% sulfuric acid and 1 part by weight of potassium dichromate while varying the temperature and time of the treatments, followed by washing with water and drying. This test was as follows: The foregoing films were printed with ink for polyethylene use (produced by Toyo Ink Manufacturing Company of Japan), and the adhesive force of the ink was determined by the cellophane tape stripping test procedure. This procedure consists of applying a 18-mm.-wide cellophane tape to the printed surface by pressing 5 times by means of thumb pressure and then rapidly pulling the tape off, the manner in which the tape pulled off being evaluated by means of the symbols "O", "Δ" and "X." These results are shown in Table III, in which:

The symbol "O" indicates that the printability is strong, the cellophane tape alone being pulled off;

The symbol "Δ" indicates that the printability is comparatively weak, the cellophane tape being pulled off with part of the ink adhering thereto; and The symbol "X" indicates the lowest value and in this case the cellophane tape pulled off with the ink adhering to the whole of the surface thereof.

TABLE III

| Treatment Conditions | | Ink Removed with Cellophane Tape | |
| --- | --- | --- | --- |
| Temperature, °C. | Time | Film of Present Invention | Control |
| Untreated | | X | X |
| 25 | 1 sec | O | X |
| 25 | 2 sec | O | X |
| 25 | 5 sec | O | X |
| 25 | 30 sec | O | X |
| 25 | 1 min | O | X |
| 50 | 1 min | O | Δ |
| 50 | 3 min | O | Δ |
| 75 | 1 min | O | Δ |
| 75 | 3 min | O | Δ |
| 95 | 1 min | O | Δ |
| 95 | 3 min | O | Δ |

As is apparent from the foregoing results, it can be seen that the film which has been biaxially stretched so as to attain the orientation indices as specified by this invention and then subjected to an oxidation treatment differs from the conventional films which have been oxidized in that the former exhibits conspicuously greater adhesion of printing inks and thus has superior printability.

In any event, it is a surprising fact that by carrying out the orientation fully of a polypropylene film such that its planar orientation index becomes not less than about $2 \times 10^{-3}$, preferably $5 \times 10^{-3}$, and that its axial orientation index becomes not over about $10 \times 10^{-3}$ it becomes possible without substantially impairing the other desirable qualities of a polypropylene film to provide with a very high surface adhesive activity which is such as could not possibly have been expected in the past.

Although it is not yet fully clear as to what relationships exist between the differences in the surface structure and weight decreases and the differences in the surface activity in adhesion and printing, it is presumed that the foregoing are interrelated and hence have an important bearing in providing an excellent polypropylene film according to the method of this invention by imparting greatly improved surface adhesive activity to the film without impairment of its other desirable qualities. Additionally, the fact that the film whose surface adhesive activity has been greatly enhanced by the method of the present invention has a transparency which is superior to that of the conventional film which has been subjected to an oxidation treatment is presumed to be due to the marked difference in their surface structure, as described hereinbefore.

It is therefore an object of the present invention to provide a method of improving the surface property of a polypropylene film which comprises, in carrying out the oxidation treatment thereof, effecting in advance its molecular orientation fully such that a planar orientation index of above a specific value and an axial orientation of below a specific value are attained and thereafter subjecting the film to an oxidation treatment, whereby the surface adhesive activity of the polypropylene film is improved very markedly without impairment of its other desirable qualities.

Another object of this invention is to provide a method of improving the surface properties of a polypropylene film by disclosing a method of imparting to a polypropylene film such qualities as adhesiveness, antistatic property, heat-sealability, gas impermeability, printability and suitability for metalizing by vacuum deposition; and also a method of sustaining the so obtained greatly improved surface adhesive activity of such a film.

According to the method of this invention, a polypropylene film is first oriented by biaxially stretching the film fully such that its planar orientation index becomes not less than about $2 \times 10^{-3}$, preferably $5 \times 10^{-3}$, and its axial orientation index becomes not over about $10 \times 10^{-3}$. For obtaining a polypropylene film having such orientation indices, a biaxial stretching in the longitudinal as well as the transverse direction of more than about 3 times, and preferably more than about 4 times at a temperature of about 130° C., is preferably carried out.

What is referred to herein as a polypropylene film includes not only the film made from stereospecific polypropylene but also the film comprising predominantly, preferably above about 80% by weight, of stereospecific polypropylene. Therefore, the blends with such other polymers as polyethylene, polystyrene, polybutadiene, etc. can also likewise be used. Further, the propylene-ethylene copolymer is also usable. The antioxidants, coloring agents, delustrants, etc. can also be added, of course.

The oxidation treatment to be given after the orientation can be by a chemical and/or physical method.

In the chemical oxidation treatment, oxidizing agents such as, for example, potassium dichromate-concentrated sulfuric acid, chlorosulfonic acid and chlorous acid can be used singly or in suitable combinations, but particularly to be preferred is the treatment by means of a potassium dichromate-concentrated sulfuric acid mixed liquor, the preferred combination in this case being that in which the sulfuric acid and potassium dichromate have been suitably combined such that their concentrations are respectively above about 80% by weight for the former and above about 0.5% by weight for the latter.

Although the temperature and time required for the treatment will vary depending upon such as the degree of orientation treatment desired, the class of oxidizing agent, the concentration, etc., when the treatment temperature is comparatively high, the usual practice is to use a time which is short, whereas when the temperature is comparatively low, the treatment time is prolonged. Thus, it is possible to use, for example, a comparatively low temperature of 20° C. or the treatment may be under conditions in which heat is applied, such as of the order of 90° C. Ordinarily, a treatment time of not more than about 10 seconds is sufficient; however, a longer treatment time may also be used. Thus, the treatment temperature and time may be suitably varied in practicing the invention.

The treatment is accomplished by contacting an oxidizing agent homogeneously with one or both surfaces of the hereinbefore-described stretched film, and the method employed may be by dipping, application by means of a roller or brush, spraying or any other conventional method of contacting a liquid with a solid surface. After effecting the contact for the desired time, it goes without saying that the film is freed from the effects of the liquid by such means as neutralization, washing with water, drying, etc.

By washing the treated surface as soon as possible after the oxidation treatment with either an amino compound having an amino group and a hydroxyl group, such, for example, as monoethanolamine, diethanolamine, aminophenol and aminonaphthol, or another amino compound having an amino group with either a hydroxyl, carboxyl or sulfonic acid group the tendency to the decrease with the passage of time of the greatly improved surface adhesive activity obtained as a result of the foregoing oxidation treatment is prevented. Moreover the decrease in the mechanical characteristic which occurs when this film treated by means of oxidation is allowed to stand while being exposed to sunlight or under application of heat is reduced considerably. These amino compounds are used by dissolving them in a suitable solvent such as, for example, water or a water-alcohol mixture. The film which has been treated by washing is preferably dried.

Further, an aqueous solution of a cationic aminoformaldehyde resin can also be used in like manner.

What is referred to herein as a cationic aminoformaldehyde resin is meant to be an aminoformaldehyde resin into which has been introduced a cationic group by means of either an acid modifier such as hydrochloric acid or acetic acid or a modifier such as a polyalkylene, polyamine or the polyfunctional aliphatic polyamine condensation products in reacting formaldehyde with either melamine, triazine or urea singly or a mixture of a plurality thereof. Again, also usable during this reaction are those substances to which have been added compounds capable of condensing with formalin, including the ketones such as acetone and methylethyl ketone, and p-toluenesulfonic acid and carbolic acid. Additionally, the mixtures of these formaldehyde condensation products may also be used.

On the other hand, the physical oxidation treatments include the corona discharge treatment, the flame treatment and the ultraviolet ray treatment, of which the corona discharge treatment is to be particularly preferred. In carrying out the oxidation by means of the corona discharge treatment a high voltage alternating current is impressed between electrodes facing each other with a dielectric intervening to generate the corona discharge, the film being passed therebetween. As the electrodes facing each other, it is convenient for the treatment of the film if a roller and a rod-shaped element which is parallel and in close proximity therewith is employed. As the dielectric, either glass, mica or a plastic film is used.

The electric voltage to be impressed may be usually of the order of 5–30 kilovolts, and the gap between the electrodes may be of the order of about 0.5–10 mm. Although the higher the frequency, the greater is the efficiency, for example, at 450 kilocycles a treatment capacity of the order of 40 meters per minute can be obtained.

The polypropylene film thus obtained by first having been biaxially stretched fully such that its planar orientation index becomes not less than about $2 \times 10^{-3}$ and its axial orientation index becomes not over about $10 \times 10^{-3}$ and then followed by subjecting to an oxidation treatment comes to have a greatly improved surface adhesive activity of the order as could not have been expected heretofore. As a result, the polypropylene film which had been severely restricted hitherto as to its utility because of its essential lack of surface adhesive activity can now be utilized satisfactorily for many purposes.

According to this inventino, the surface of the polypropylene film, obtained as above, whose oxidation treatment has been completed can be covered further with various surface reforming materials to provide a polypropylene film having markedly superior adhesiveness, antistatic property, heat-sealability, gas permeability, printability and suitability for metalizing by vacuum deposition, without impairing the desirable qualities essentially possessed by a polypropylene film.

Next will be described the method of improving the surface properties of a polypropylene film by covering further the surface of the film subsequent to its oxidation treatment with a reforming material according to this invention. The reforming material can be applied by using either alone or in suitable combination means such as coating, laminating, vacuum deposition, etc. Utilizable for coating are such conventional techniques as dipping, application with a roller or brush, spraying, etc. For effecting lamination, lamination by extrusion can be conveniently employed. Further, such a reforming operation may be carried out on the whole or a part of the surface of the film which has been previously given oxidation treatment.

As such surface reforming materials included are such as the natural or synthetic high molecular resin materials, organometallic complexes, and vacuum-depositable metals. As the resin materials, the following materials are conveniently utilized:

(1) Polyolefin resins (a) Polyethylene
(b) Polypropylene
    Principally applied by extrusion coating to improve heat-sealability. In applying this coating, the adhesion is improved further, if the surface is first treated with, say, an alkyl titanate.

(2) Vinyl resins (a) Polyvinyl acetate
(b) Polyvinyl chloride
(c) Vinyl chloride-vinyl acetate copolymer
(d) Vinyl chloride-vinyl acetate-maleic acid copolymer
(e) Vinyl acetate-ethylene copolymer
(f) Polyvinyl alcohol
(g) Polyvinyl butyral
    The materials listed under items a to e are effective in providing heat-sealability to render the film suitable for overwrapping automatic packaging purposes. Among these, polyvinyl acetate is somewhat inferior as to its softening temperature, while polyvinyl chloride is slightly inferior in its adhesiveness. The copolymers listed as items c and d give the most suitable heat-sealability. Polyvinyl alcohol, while providing antistatic effects on one hand, is effective in decreasing the gas permeability of the film. As to polyvinyl butyral, it is used along with the substances listed as items a–e as a primer in the vacuum deposition of metal.

(3) Vinylidene resins (a) Polyvinylidene chloride
(b) Vinylidene chloride-acrylonitrile copolymer
(c) Vinylidene chloride-vinyl chloride copolymer
    These resins are effective in decreasing the gas permeability of the film, the copolymer listed as b being especially suitable. Good results are obtained in the improvement of heat-sealability also.

(4) Cellulose derivatives

By coating a mixture consisting of such as nitrocellulose, dammar and dioctylphthalate good results are obtained in the improvement of heat-sealability as well as a primer for the vacuum deposition of metals.

(5) Polyamide resins

A low molecular weight polyamide comprising an unsaturated aliphatic acid reacted with, say, ethylene diamine. Good as a primer for vacuum deposition of metals. Gives good results also when mixed with the alkyd resins and epoxy resins.

(6) Polyester resins (a) Polyethylene terephthalate-isophthalate
(b) Copolymers of maleic anhydride or phthalic anhydride with propylene glycol, ethylene glycol or styrene (for vacuum deposition).

(7) Polyurethane resins

The reaction product of diphenylmethane diisocyanate and a polyester (for vacuum deposition)

(8) Epoxy resins

The reaction product of epichlorohydrin and "Bis Phenol-A" hardened with polyamine and polyamide (for vacuum deposition)

(9) Alginates (for antistatic treatment)

(10) Alkali metal salts of carboxymethyl cellulose (for antistatic treatment)

(11) Polyacrylates (for antistatic treatment)

Further, the natural high molecular substances such as casein, glue, gelatin, gloiopeltis glue, tragacanth gum, Irish moss, etc. can also be used for antistatic treatment.

Next will be described in detail the procedures to follow when the foregoing reforming materials are to be used according to the method of this invention.

A. The surface of a polypropylene film biaxially stretched fully until its planar orientation index becomes not less than about $2 \times 10^{-3}$ and its axial orientation index becomes not over about $10 \times 10^{-3}$, after having been subjected to an oxidation treatment, is coated further with a resin such as mentioned above, particularly a thermoplastic resin and preferably a thermoplastic resin as will fuse and adhere at a temperature of below 100° C., for example, such as polyvinyl acetate or polyvinyl chloride alone or the copolymer thereof and the vinylidene chloride-acrylonitrile copolymer, whereby is obtained a film excelling in such qualities as heat-sealability, gas impermeability, suitability for metalizing by vapor deposition and laminability.

In this case, plasticisers and surfactants may also be added to the foregoing resin materials, if necessary. Further, particularly to be preferred for attaining a marked improvement in the antistatic property is the use of the foregoing materials after having applied the various water-soluble polymers which are conventionally used for the purpose of preventing a static charge, such as, for example, an alkali metal salt of carboxymethyl cellulose, an alkali metal salt of alginic acid, an alkali metal salt of acrylic acid, tragacanth gum, gum karaya, Irish moss, starch, casein, gelatin, gum arabic polyvinyl alcohol, glue and gloiopeltis glue.

By practicing the method of the present invention in a manner as described above, a film for packaging use the coating of which does not strip off and which possess little or no gas permeability can be obtained. Moreover, this film has good heat-sealability as well as exceedingly excellent transparency, toughness and moistureproofness. Thus, an excellent overwrapping film can be provided. Further, by application of an antistatic agent its antistatic property can be enhanced still further. Such an antistatic polypropylene film can be used widely in the automatic packaging field. Again, the excellent heat-sealability required of such a resin material can be obtained by using a vinyl chloride-vinyl acetate copolymer or a vinyl chloride-vinyl acetate-maleic acid terpolymer. In this instance, the preferred practice consists of first applying a water-soluble polymer as indicated above and then using the vinyl chloride-vinyl acetate-maleic acid terpolymer, and preferably a solution terpolymer obtained by solution polymerizing the three components of vinyl chloride, vinyl acetate and maleic anhydride in a solvent using a radical catalyst. Preferably, the monomeric composition of this solution terpolymer comes within the ranges of 65–78% vinyl chloride, 21–34.7% vinyl acetate and 0.3–1% maleic anhydride. While the esters such as butyl acetate and ethyl acetate are preferred as the solvents to be used in solution polymerizing the monomers on account of such as their polymerizability, adhesiveness and economy, ketone, bezene and the halogenated hydrocarbons can also be used.

B. A polypropylene film is biaxially stretched fully until its planar orientation index becomes not less than about $2 \times 10^{-3}$ and its axial orientation index becomes not over about $10 \times 10^{-3}$, after which the surface of this polypropylene film is subjected to an oxidation treatment and thereafter coated with polyvinyl-acetate in which has been incorporated polyethylene imine whereby is made possible the coating of the polypropylene film very firmly with this class of bonding agent, which heretofore was not possible of being coated to a polypropylene film substantially firmly enough as to be of use owing to the lack of a surface adhesive activity on the part of said film. In this manner, an improved polypropylene film having a very excellent adhesive force can be obtained, which is suitable for, say, laminating or extrusion laminating to the polypropylene film of polyvinyl chloride, polyvinylidene chloride, nitrocellulose, polyethylene or an aluminum foil. Thus, can be provided a coated or laminated film excelling in printability, heat-sealability and gas impereability.

The mixing of the polyethylene imine in the polyvinyl acetate may be accomplished by adding the former to either a solution or an aqueous emulsion of the latter. Alternatively, the polyethylene imine may be kneaded directly into the polyvinyl acetate and used as a hot-melt bonding agent. In this case, while the amount of polyethylene imine additions by which effects can be observed is of the order of from about 0.01% to about 80%, the preferred amount is from about 0.1% to about 60%.

C. When a polypropylene film is biaxially stretched fully until its planar orientation index becomes not less than about $2 \times 10^{-3}$ and its axial orientation index becomes not over about $10 \times 10^{-3}$, after which the surface of this polypropylene film is subjected to an oxidation treatment and thereafter covered with a water-soluble aqueous polymer solution, the polypropylene film can be imparted with such as excellent antistatic property, packageability, etc. The water-soluble polymers which can be used in this case are those already described in section A, above. Of these polymers, particularly to be preferred is the combined use of a protein-type polymer which possesses affinity for water and which exhibits adhesiveness upon being dried, such as, for example, casein, soybean casein, glue, gelatin, etc. with a nonprotein-type polymer such as, for example, alkali metal salts of carboxymethyl cellulose, the alkali metal salts of alginic acid, the alkali metal salts of polyacrylic acid, tragacanth gum, gum karaya, Irish moss, gum arabic, polyvinyl alcohol, etc. The proportion in which these protein-type polymers are mixed with the nonprotein-type polymers can be suitably selected. Further, the concentration in which the aqueous solution can be used may be, say, not more than 1%, or a concentration on the order of 30% can also be used. The object is achieved by coating these aqueous solutions followed by drying.

Although the application, in general, is either by means of the method in which a sponge roller is used or the method in which the film is dipped in a tank, spraying and other conventionally used means can be employed.

Further, the incorporation of polyethylene imine in the water-soluble aqueous polymer solution is most suitable for increasing still more the adhesiveness of the film. The objective is fully achieved in this respect by the addition of the polyethylene imine in an amount on the order of about 1–10% by weight based on the water-soluble polymer.

In any of the hereinbefore described instances, plasticizers and lubricants may also be added.

In adding the polyethylene imine to the aqueous solution containing the water-soluble polymer, it goes without saying that the addition of a substance that is reactive with polyethylene imine must be avoided. Moreover, since the reactivity of polyethylene imine is enhanced by its being heated, in storing the mixed solution which contains polyethylene imine caution should be exercised to insure against its being heated.

In effecting the adhesion to the polypropylene film of the water-soluble polymer solution incorporated with polyethylene imine according to this invention, it may be coated to the whole of the film; or if it is to be used for adhesion, it may be coated to only that part which is to be adhered.

Further, it is also possible to obtain good adhesion between the polypropylene film and other plastic films or paper, etc.

When the method of the present invention is carried out by means of an embodiment in which polyethylene imine is incorporated, such as described above, a film in which static charge is permanently prevented through the medium of a water-soluble polymer can be made. Further, when the method of this invention is carried out as an adhesion method, it becomes possible to carry out packaging operations readily by means of a conventional packaging machine employing water-soluble bonding agents. Again, the invention provides not only a film having good adhesive property but also that which is suitable for the packaging of food products, etc.

D. When a polypropylene film is biaxially stretched fully until is planar orientation becomes not less than about $2 \times 10^{-3}$ and its axial orientation index becomes not over about $10 \times 10^{-3}$, after which the surface of this polypropylene film is subjected to an oxidation treatment and thereafter coated with a solution of at least one organic titanium compound in an organic solvent, the adhesive property of the propylene film can be improved when laminating thereto, for example, polyethylene, polypropylene, etc. by means of the extrusion lamination technique. In this case, if both the film to serve as the support and the film to be laminated are subjected in advance to an oxidation treatment in accordance with this invention, a marked enhancement of the adhesive property can be attained.

As such reforming materials, included are the alkyl titanate having the general formula $Ti(OR)_4$ where R is an alkyl. These compounds are hydrolyzed by means of the moisture in the atmosphere and form an amorphous titanium oxide film on the surface of the polypropylene film. The titanate generally used is either tetraetoxy titanate, tetrapropyl titanate or tetra-n-butyl titanate, and as the hydrolysis rate regulating agent titrastearyl titanate is added. As the solvent, an organic solvent is used, such as isopropylalcohol, toluene, hexane, kerosene, ethyl acetate and chlorinated hydrocarbons. Further, as the titanate derivatives, there can be named for example, the reaction product of alkyl titanates with acetyl acetone.

In accordance with the foregoing embodiment, a biaxially stretched polypropylene film can be extrusion laminated with other polyolefins with sufficient adhesive force. Further, the operation of heat-sealing which was hitherto difficult of carrying out can now be accomplished satisfactorily.

E. When a polypropylene film is oriented until its planar orientation index becomes not less than about $2 \times 10^{-3}$ and its axial orientation index becomes not over about $10 \times 10^{-3}$, after which the surface of this polypropylene film is subjected to an oxidation treatment and thereafter coated with a polymer containing oxygen in its main and/or side chains, the extreme difficulty encountered heretofore in metalizing a polypropylene film by vacuum deposition and the defect that the so deposited metal film would easily peel off the surface of the film could be overcome. For instance, it was possible heretofore to coat a polypropylene film with a polyvinyl butyral resin and then vacuum deposit aluminum thereon thereby providing a firm adhesive force between the polyvinyl butyral layer and the vacuum deposited aluminum film, but, in this case, the adhesive force between the polypropylene film and the polyvinyl butyral layer, was insufficient, with the consequence that separation would take place therebetween. Hence, it was impossible heretofore to obtain satisfactory polypropylene films metalized by vacuum deposition. On the other hand, according to the method of this invention, it is possible to effect the formation of vacuum deposited metal film which is very firmly bonded to the polypropylene film.

As the metals to be used for vacuum deposition, included are copper, silver, zinc, aluminum, etc., of which aluminum is preferred.

As the aforementioned polymers containing oxygen in their main and/or side chains, there can be used the polyester resins, polyamide resins, polyurethane resins, epoxy resins, cellulose derivatives, polyvinyl butyral resin, and the polymers comprising predominantly vinyl acetate.

Taking the case of aluminum which is the most generally used as the metal for vacuum deposition, it can be made to adhere to the film by heating to 1300–1400° C. in a vacuum of $10^{-5}$–$10^{-3}$ mm. Hg. For preventing the heat shrinkage of the film at this time, it is particularly preferred that the film be cooled from the side opposite to that to which the metal is deposited.

The generally practiced and preferable method of providing the aforesaid polymeric layer to the surfaces of the polypropylene film given an oxidation treatment according to this invention consists of dissolving the foregoing polymer in a suitable solvent followed by application the polymer solution to the surface of the film. It is also however possible to carry out a method in which a film of the foregoing polymer is laminated.

While we have illustrated hereinbefore the instances of using various reforming materials in the method of the present invention, the effective use of these reforming materials with a polypropylene film has been made possible for the first time by means of this invention.

The following examples are given for a clearer understanding of the nature of the present invention, it being understood that the invention is not restricted to the embodiments illustrated, and that many changes and modifications can be made therein as will be apparent to those skilled in the art. All parts and percentages in the examples are by weight unless otherwise indicated.

*Example 1*

A polypropylene film 22 micron in thickness which was biaxially stretched until its planar orientation index (hereinafter to be abbreviated to PO index) was $3.6 \times 10^{-3}$ and its axial orientation index (hereinafter to be abbreviated to AO index) was $3.6 \times 10^{-3}$ was subjected to an oxidation treatment by means of a corona discharge treatment. Films obtained by a 15-second electric discharge treatment with the gap between the electrode and treatment roll being 5 mm. and the impressed voltages being varied (10, 15, 17.5 and 20 kilovolts) were measured for their ink adhesive force by means of the cellophane stripping test described in connection with Table III given hereinbefore. The results obtained were as shown in Table IV, below. By way of comparison, as Control 1, films obtained by giving the same treatment to a polypropylene film of the same thickness but having a PO index of $0.5 \times 10^{-3}$ and an AO index of $1.0 \times 10^{-3}$ were likewise measured for their adhesive force, and these results are also presented.

The method of rating was the same as that used in connection with Table III.

TABLE IV

| Treatment Conditions | | Ink Removed with Cellophane Tape | |
|---|---|---|---|
| Voltage Impressed, kv. | Time, sec. | Example 1 | Control 1 |
| Untreated | ---- | X | X |
| 10 | 15 | X | X |
| 15 | 15 | Δ | X |
| 17.5 | 15 | O | X |
| 20 | 15 | O | Δ |

*Example 2*

A polypropylene film having the same orientation indices as in Example 1 was subjected to an oxidation treatment by dipping for 3 seconds in a potassium dichromate mixed liquor (90 parts sulfuric acid, 1 part potassium dichromate, 9 parts water) at 30° C. After thorough washing and drying of the oxidation treated film, a 20% solution in methylethyl ketone of "Saran" F 220 [a copolymer of polyvinylidene chloride and polyacrylonitrile (hereinafter to be abbreviated to PVDC.PAN)] and likewise of "Viclan" A 90/01 [PVDC(90%).PAN(10%)], as the reforming materials, were each applied by means of a coater uniformly to one side of said film and dried. The thickness of the applications was 3–6μ.

For determining the adhesive force of this type of coating which has been applied to a film, a 1-cm.-wire cellophane tape was applied to the coating and the force (g./cm.) was measured when this tape was being pulled off. On the other hand, by way of comparison, the same test was conducted on a film which was not subjected to an oxidation treatment as above (Control 2) and also on the film presented as the control in Example 1 (Control 3). The results obtained are set forth in Table V, below.

TABLE V

| | Adhesive Forces, g./cm. | | |
|---|---|---|---|
| | Example 2 | Control 2 | Control 3 |
| "Saran" | 30 | 1–3 | 5 |
| "Viclan" | 30 | 1–3 | 5 |

*Example 3*

After subjecting a polypropylene film having the same orientation indexes as that of Example 1 to the oxidation treatment described in Example 2, coatings were applied of 20% solutions in methylethyl ketone of "Saran" F 220 and "Viclan" A 90/01, as the reforming materials. When the oxygen transmission rate (ASTM D–1434–58) of the samples before and after coating were determined, the results obtained were as shown in Table VI. Determinations of the amount of oxygen transmission rate was in accordance with the procedures described in Ind. Engng. Chem. 16, 58 (1944).

From these results, it can be seen that there is a marked improvement in the gas interception of the film due to the reforming material.

TABLE VI

| Class of Surface Reforming Material | Thickness of the Surface Reforming Material, μ | Oxygen Transmission Rate, cc. (N.T.P.)/m.², 24 hr./atm. |
|---|---|---|
| None | ---- | 1,000 |
| "Saran" F 220 | 3 | 5.4 |
| Do | 6 | 3.2 |
| "Viclan" A 90/01 | 3 | 5.4 |
| Do | 6 | 2.7 |

*Example 4*

The films tested in Example 3 were made into tubes having an inside diameter of 3 cm. and length of 20 cm. by sealing with an untrasonic sealer. To a mixture consisting of 1 part of ground beef, 1 part of flour and 1.5 parts of water were added 0.1% of potassium nitrite and 3% of table salt, after which it was allowed to stand in a refrigerator (+3° C.) for 2 days. The mixture was then packed into the foregoing tubes, the two ends thereof then being bound with rubber bands, after which the packed tubes were heated for 40 minutes in 90° C. hot water.

The samples obtained were allowed to stand in 40° C. air and the state of decoloring occurring in the contents with the passage of time was observed. As shown in Table VII, the decoloring of the sample in which a surface reforming material was not used was pronounced and it is seen that there exists a relationship between the decolorization of the contents and the oxygen transmission rate of the films. By way of comparison, presented are the results of samples prepared in like manner using a 50-micron-thick film of a vinyl chloride-vinylidene chloride copolymer presently being used for packaging of meats (Control 4).

TABLE VII

| Class of Surface Reforming Material | Thickness of Surface Reforming Material | State of Decoloring*—Days Elapsed | | | | | | |
|---|---|---|---|---|---|---|---|---|
| | | 1 | 2 | 4 | 5 | 6 | 8 | 10 | 12 |
| None | ---- | ⊙ | Δ | Δ | ▲ | | | | |
| "Saran" F 220 | 3 | ⊙ | | | | | | → | ⊙ |
| Do | 6 | ⊙ | | | | | | → | ⊙ |
| "Viclan" A 90/01 | 3 | ⊙ | | | | | | → | ⊙ |
| Do | 6 | ⊙ | | | | | | → | ⊙ |
| Control 4 | ---- | ⊙ | | | | | → | ⊙ | O | ⊙ |

\* ⊙ Decoloration not observed at all.
O Slight decoloration.
Δ Definite decoloration.
▲ Almost completely decolored.

*Example 5*

An 18-micron-thick polypropylene film biaxially stretched and having a PO index of $7.5 \times 10^{-3}$ and an AO index of $5.7 \times 10^{-3}$ (Experiment 5) and an 18-micron-thick polypropylene film having a RO index of $1.0 \times 10^{-3}$ and an AO index of $0.7 \times 10^{-3}$ (Control 5) were treated with a potassium dichromate mixed liquor (90 parts sulfuric acid, 1 part potassium dichromate and 9 parts water), washed with water and dried. The so obtained samples were tested for their adhesive force with respect to reforming materials, capacity for adhering printing ink, haze and heat-sealability. The results are shown in Table VIII.

The procedures employed in determining the various properties were as follows:

Adhesive force with respect to reforming materials: Procedures as described in connection with Table V.

Capacity for adhering printing ink: Procedures as described in connection with Table III.

Haze: Procedures according to JIS K 6714.

Heat-sealability: A sentinel controlled laboratory sealer (manufactured by the Packaging Industry Company, U.S.A.) was employed, and the adhesive property as determined from the manner in which the stripping of the reforming material from the film was accomplished after sealing under conditions of a pressure of 25 p.s.i., a voltage of 20 volts, a clamp time of 5 seconds and a current flow time of 2 seconds was evaluated with the symbols O, Δ and X; O indicating that either breakage or stretching of the film occurred; Δ indicating that separation took place from the sealed portion; and X indicating that practically no adhesion occurred.

TABLE VIII

| Sample | Treatment Conditions Temp., °C | Treatment Conditions Time, sec. | Control 5 Adhesive Force, g./cm. | Control 5 Printability | Control 5 Haze, Percent | Control 5 Heat-Sealability | Experiment 5 Adhesive Force, g./cm. | Experiment 5 Printability | Experiment 5 Haze, Percent | Experiment 5 Heat-Sealability |
|---|---|---|---|---|---|---|---|---|---|---|
| 1 | (1) | --- | (2) | X | 2.0 | O | (3) | X | 2.0 | O |
| 2 | 25 | 1 | 0.2 | X | 2.9 | O | 25 | Δ | 2.2 | O |
| 3 |  | 2 | 1.5 | X | 2.2 | O | 47 | O | 2.2 | O |
| 4 |  | 5 | 3.0 | X | 2.1 | O | 58 | O | 2.8 | O |
| 5 |  | 30 | 3.2 | X | 2.6 | O | 62 | O | 2.0 | O |
| 6 |  | 60 | 2.9 | X | 2.2 | O | 75 | O | 2.9 | O |
| 7 | 60 | 2 | 3.1 | X | 2.8 | O | 66 | O | 2.8 | O |
| 8 |  | 4 | 3.5 | X | 2.6 | O | 65 | O | 2.2 | O |
| 9 |  | 6 | 4.1 | X | 2.3 | O | 67 | O | 2.2 | O |
| 10 |  | 8 | 3.8 | X | 2.6 | O | 72 | O | 2.6 | O |
| 11 |  | 10 | 3.7 | X | 2.2 | O | 73 | O | 2.6 | O |
| 12 |  | 60 | 4.0 | Δ | 2.3 | Δ | 81 | O | 2.5 | Δ |
| 13 | 90 | 3 | 5.0 | Δ | 5.9 | Δ | 57 | O | 2.7 | Δ |
| 14 |  | 6 | 5.4 | Δ | 9.8 | X | 67 | O | 2.9 | Δ |
| 15 |  | 10 | 6.3 | O | 11.8 | X | 72 | O | 3.0 | X |
| 16 |  | 30 | 6.5 | O | 27.6 | X | 69 | O | 3.3 | X |
| 17 |  | 60 | 9.1 | O | 37.4 | X | 87 | O | 3.1 | X |
| 18 |  | 120 | 10.0 | O | 48.6 | X | 115 | O | 3.2 | X |

1 Untreated.
2 Not above 0.2.
3 Not above 0.1.

As is apparent from the foregoing table, when the treatment conditions become severe in the case of Control 5, the heat-sealability of the film declines. Further, there occurs an extreme decrease in the transparency of the film (i.e., an increase in the haze) so as to render the film unfit for practical use because of its becoming turbid at those treatment conditions at which effects become somewhat apparent in its adhesiveness.

*Example 6*

Polypropylene films of Experiment 5 and Control 5 of Example 5 (to be made films of Experiment 6 and Control 6, respectively) were each treated for 5 seconds at 25° C. with a treatment liquors whose composition of sulfuric acid, potassium dichromate and water was varied. Then after washing with water and drying, their adhesive forces with respect to surface reforming materials were measured as in Example 5, the results of which are shown in Table IX.

TABLE IX

| Composition of Treatment Liquor, wt. | | | Adhesive Force, g./cm. | |
|---|---|---|---|---|
| Sulfuric Acid (96%) | Potassium dichromate | Water | Experiment 6 | Control 6 |
| Untreated |  |  | 0.1-0.2 | 0.1-0.2 |
| 100 | 0 | 0 | 0.2 | 0.2 |
| 99.0 | 0.1 | 0 | 6 | 2 |
| 99.8 | 0.2 | 0 | 15 | 1.5 |
| 99.5 | 0.5 | 0 | 68 | 3.3 |
| 99.0 | 1.0 | 0 | 55 | 4.3 |
| 98.0 | 2.0 | 0 | 62 | 5.3 |
| 90.0 | 1.0 | 9.0 | 63 | 3 |
| 80.0 | 1.0 | 19.0 | 31 | 4 |
| 80.0 | 2.0 | 18.0 | 68 | 4 |
| 70.0 | 2.0 | 28.0 | 16 | 3 |
| 70.0 | 3.0 | 27.0 | 21 | 5 |

*Example 7*

An 18-micron-thick polypropylene film having a PO index of $4.3 \times 10^{-3}$ and an AO index of $3.5 \times 10^{-3}$ was subjected to a corona discharge treatment (gap between electrodes 10 mm., voltage impressed 20 kv.). The adhesive force of a surface reforming material to its surface was then measured as in Example 5. In Table X is shown the relationship between the treatment times and the adhesive forces obtained.

TABLE X

Corona discharge time: Adhesive force, g./cm.
0 _____ 2
30 sec. _____ 2
1 min. _____ 3
3 min. _____ 8
5 min. _____ 12
10 min. _____ 20

*Example 8*

While its one side was being cooled, a polypropylene film identical to that used in Example 7 was subjected to a flame treatment by directing against its other side a flame resulting from the burning of producer gas with a gas burner comprising a steel pipe provided with small holes thereabove. When the adhesive forces of the treated surface with respect to surface reforming materials were measured as in Example 5, results obtained were as set forth in Table XI.

TABLE XI

Flame treatment time sec.: Adhesive force, g./cm.
0 _____ 2
0.5 _____ 9
1 _____ 13
2 _____ 18
3 _____ 18

*Example 9*

When a polypropylene film identical to that used in Example 7 was dipped for 10 second in an aqueous sodium hypochlorite solution containing 5% effective chlorine at 40° C., a film having the following properties was obtained: Adhesive force with respect to surface reforming materials 34 g./cm., printability O, haze 2%, heat-sealability O. (The measurement of the various properties was by procedures similar to those of Example 5.)

*Example 10*

A polypropylene film similar to that of Example 7 (sample A) was treated with a mixed liquor consisting of 99 parts of 96% sulfuric acid and 1 part of potassium dichromate for 5 seconds at 30° C. followed by washing with water and drying (sample B). To both surfaces of sample B was applied a 5% ethyl acetate solution of "Vinylite Resin" VMCH (a copolymer of 86% vinyl chloride, 13% vinyle acetate and 1% maleic anhydride, a product of Union Carbide Company, U.S.A.)

to a thickness as would yield a 2-micron-thick film upon drying, after which it was dried for 2 minutes at 70° C. (sample C). To sample B was applied as an antistatic agent a 0.5% aqueous solution of sodium alginate to a thickness as would yield a 0.5-micron-thick film upon drying, after which it was dried for 5 minutes at 70° C., this application being made to one surface of the film and also to both surfaces thereof (samples D and E, respectively). To samples D and E were applied "Vinylite" Resin VMCH in the same manner as was done when preparing sample C (samples F and G, respectively).

These samples were applied to a cigarette package overwrapping machine model TAM for use with waterproof Cellophane (manufactured by Tokyo Jido Kikai Kabushiki Kaisha, Japan), and investigations were conducted with respect to their adhesion to the metallic rolls (a criterion of whether or not static charge occurs) and their heat-sealability. The results obtained are set forth in Table XII.

TABLE XII.—MECHANICAL SUITABILITY FOR AUTOMATIC WRAPPING OPERATIONS

| Sample | Adhesion to Metal [1] | Heat-Sealability [2] |
|---|---|---|
| A | X | X |
| B | X | X |
| C | X | O |
| D | O | X |
| E | O | X |
| F | O | O |
| G | O | O |

[1] If adhesion to metal occurs, the film cannot be fed automatically, thus making continuous wrapping impossible. Accordingly, the symbol "O" indicates that adhesion to metal does not occur, thus making continuous operation possible; and the symbol "X" indicates the occurrence of adhesion to metal, thus making continuous operation impossible.
[2] The heat-sealability of the film was tested by judging as to whether the heat sensitive adhesive would fuse and adhesion take place by contact for 0.5 seconds with a heat plate (surface temperature 120° C.) provided in the machine. The symbol "O" indicates that the heat sensitive adhesive fuses and adheres; and the symbol "X" indicates that fusion and adhesion does not take place.

*Example 11*

A 20-micron-thick polypropylene film having a PO index of $5.0 \times 10^{-3}$ and an AO index of $2.5 \times 10^{-3}$ and a 20-micron-thick polypropylene film having a PO index of $0.5 \times 10^{-3}$ and an AO index of $1.0 \times 10^{-3}$ were dipped for 10 seconds in a potassium dichromate mixed liquor (90 parts sulfuric acid, 1 part potassium dichromate and 9 parts water) at 30° C., after which the films were washed with water and dried (which were designated films of Experiment 7 and Control 7, respectively). To these films were applied the various classes of surface reforming materials indicated below, after which the adhesive forces of films were measured. The results are as set forth in Table XIII.

*Surface reforming material 1.*—A 10% solution in a 1:1 mixture of MEK:toluene of "Vinylite" Resin VMCH, which was applied to a thickness as would yield a 1-micron-thick film upon drying.

*Surface reforming material 2.*—An aqueous solution of 5% "Vinacol" MH (polyvinyl alcohol) and 0.3% "Polymine" P (polyethylene imine), which was applied to a thickness as would yield a 0.5-micron-thick film upon drying, after which a further application of the surface reforming material 1 was made.

*Surface reforming material 3.*—To a monomer mixture comprising 70 parts of vinyl chloride, 29.2 parts of vinyl acetate and 0.8 part of maleic anhydride was added 0.01 part of lauryl peroxide as the catalyst, which mixture was then polymerized for 40 hours in 100 parts of butyl acetate at 55° C. This coating material was made into a 10% solution, the application being to a thickness as would yield a 1-micron-thick film upon drying.

*Surface reforming material 4.*—Instead of using surface reforming material 1 in surface reforming material 2, surface reforming material 3 is used.

*Surface reforming material 5.*—A 10% solution in 50/50 ethyl acetate/butyl acetate of "Zeon" 400L3 (a copolymer predominantly vinyl chloride produced by Nihon Zeon Company, Japan), which is applied to a thickness as would yield a 1-micron-thick film upon drying.

*Surface reforming material 6.*—Instead of using surface reforming material 1 in surface reforming material 2, surface reforming material 5 is used.

*Surface reforming material 7.*—A copolymer polymerized by using the monomer composition of the surface reforming material 3 but with water as the polymerizing medium and with polyvinyl alcohol as the suspension stabilizing agent was dissolved in methylethyl ketone to a concentration of 10%, which solution was used instead of surface reforming material 1 in surface reforming material 2.

TABLE XIII

| Surface Reforming Material | Adhesive Force, g./cm. | |
|---|---|---|
| | Experiment 7 | Control 7 |
| 1 | 85 | 2 |
| 2 | 25 | 2 |
| 3 | 90 | 3 |
| 4 | 80 | 2 |
| 5 | 80 | 3 |
| 6 | 18 | 2 |
| 7 | 17 | 2 |

*Example 12*

The film of Experiment 7 in Example 11 was coated with a 0.1% aqueous solution of a polyakylamine modified melamine-formaldehyde resin and dried at room temperature. A methylethyl ketone solution of "Saran" F 220 was then applied followed by drying at 80° C.: When measured for its adhesive force, this film had an adhesive force of 250 g./cm.

On the other hand, when "Saran" F 220 was applied directly to the film of Experiment 7, its adhesive force was 30 g./cm.

*Example 13*

A 20-micron-thick polypropylene film having a PO index of $50 \times 10^{-3}$ and an AO index of $2.5 \times 10^{-3}$ was dipped for 1 second in a 2% trichloroethylene solution of chlorosulfonic acid, after which it was treated with a 0.5% aqueous solution of a hydrochloric acid modified cationic melamine-formaldehyde resin followed by drying at 60° C.

To this was extrusion laminated "Sumikathene" L–70 (polythylene by the high pressure process, manufactured by Sumitomo Chemical Company, Japan) at a die temperature of 300° C. so that the thickness of the polyethylene would become 40 millimicrons. The adhesive force was 79 g./cm.

On the other hand, when the treatment with the hydrochloric acid modified cationic melamine-formaldehyde was not given, the adhesive force was 35 g./cm.

*Example 14*

A 20-micron-thick polypropylene film having a PO index of $5.0 \times 10^{-3}$ and AO index of $2.5 \times 10^{-3}$ (sample H) was dipped for 3 seconds in a potassium dichromate mixed liquor (90 parts sulfuric acid, 1 part potassium dichloromate and 9 parts water) at 30° C. followed by washing with water (sample I), and thereafter immediately dipped for 1 second in a 5% aqeous methanol solution (1:1 water: methanol mixture) of diethanolamine followed by washing with water and drying (sample J).

To each of the foregoing samples were applied separately a 10% ethyl acetate solution of "Vinylite" Resin VMCH and a 10% methylethyl ketone solution of Saran F 120 to a thickness as would yield a 1-micron-thick film upon drying. When the adhesive forces of these samples were measured, the results obtained were as shown in Table XIV.

TABLE XIV

| Sample | Adhesive Force, g./cm. | |
| --- | --- | --- |
| | "Vinylite" Resin VMCH | "Saran" F 120 |
| H | 5 | 5 |
| I | 9.0 | 50 |
| J | 180 | 170 |

*Example 15*

Sample H of Example 14 was subjected for 10 minutes to a corona discharge treatment with a gap between the electrodes of 10 mm. and an impressed voltage of 20 kilovolts (sample K). This was treated as in Example 14 with a diethanolamine solution (sample L).

The adhesive force of each sample with respect of "Vinylite" Resin VMCH was measured as in Example 14. The results obtained are set forth in Table VX.

TABLE XV

| Sample: | Adhesive force, g/cm. |
| --- | --- |
| H | 5 |
| K | 20 |
| L | 200 |

*Example 16*

Sample I of Example 14 was dipped for 2–3 seconds in a 5% ethyl acetate solution of p-aminobenzoic acid at 25° C., then washed with water and dried (sample M).

The adhesive forces of these samples with respect to "Vinylite" Resin VMCH were measured as in Example 14 to give the results in Table XVI.

TABLE XVI

| Sample: | Adhesive force, g/cm. |
| --- | --- |
| I | 90 |
| M | 200 |

*Example 17*

While cooling one side of sample H of Example 14, its other side was subjected to a flame treatment by directing for 1 second a flame resulting from the burning of producer gas with a gas burner comprising a steel pipe provided with small holes thereabove (sample N). This was then dipped for 2 seconds in a 5% alcohol solution of 4-amino-1-naphthol followed by washing with water and drying (sample O).

The adhesive force with respect to "Vinylite" Resin of each sample was measured as in Example 14. The reults obtained are presented in Table XVII.

TABLE XVII

| Sample: | Adhesive force, g./cm. |
| --- | --- |
| N | 20 |
| O | 200 |

*Example 18*

Sample I of Example 14 was dipped for 3 seconds in a 5% aqueous solution of glycine at 25° C. followed by washing with water and drying (sample P).

To the foregoing samples was applied a 5% methylethyl ketone to a thickness as would yield a 1-micron-thick film upon drying. The adhesive forces, when measured, were as shown in Table XVIII.

TABLE XVIII

| Sample: | Adhesive force, g./cm. |
| --- | --- |
| I | 30 |
| P | 150 |

*Example 19*

Sample K of Example 15 was dipped for 5 seconds in a saturated aqueous solution of meta-aminobenzenesulfonic acid, washed with water and dried (sample Q). The so treated film had good printability. Although in the case of sample K the printing ink was susceptive to exfoliation upon standing outside for a month, sample Q withstands more than 2 months of exposure to the elements.

Further, this effect continues almost permanently.

*Example 20*

Sample K of Example 15 was coated with a polyvinyl acetate-polyethylene imine solution consisting of 190 kg. of ethanol (60% ethanol solution), 10 kg. of water, 2.5 kg. of polyvinyl acetate and 0.8 kg. of polyethylene imine (40% aqueous solution). When its adhesive force was measured, after drying, it was 220 g./cm.

As a control, that which did not contain polyethylene imine had an adhesive force of 34 g./cm.

*Example 21*

Sample I of Example 14 was coated with a mixture consisting of an emulsion type polyvinyl acetate in which had been incorporated 24% of polyethylene imine based on the resin content of the former. When, after drying of the film, its adhesive force was measured, it was 1859 g./cm.

Further, when to this sample was extrusion laminated polyethylene as in Example 13, the adhesive force of the polyethylene was 180 g./cm.

*Example 22*

Sample I of Example 14 was coated with an emulsion type polyvinyl acetate in which had been incorporated 24% of polyethylene imine and at the same time was laminated with a paper. After drying, when an attempt was made to separate the two from each other by pulling the two apart, it was difficult to strip the paper without breaking it.

*Example 23*

An 18-micron-thick polypropylene film having a PO index of $7.0 \times 10^{-3}$ and an AO index of $4.5 \times 10^{-3}$ was treated for 10 seconds with a potassium dichromate mixed liquor (90 parts sulfuric acid, 1 part potassium dichromate and 9 parts water) at 30° C., after which it was washed with water and dried (sample R).

To this sample were applied a 5% aqueous solution of polyvinyl alcohol ("Vinacol" MH) and also this same solution in which polyethylene imine ("Polymine" P) was incorporated in amounts ranging from 0.1–5.0 wt. percent, the applications being made to a thickness as would yield a 1-micron-thick film upon drying. The samples were then dried for 10 minutes at 70° C. In Table XIX are shown the results obtained, when measurements of their adhesive forces were made.

TABLE XIX

| Amount of "Polymine" P percent: | Adhesive force, g./cm. |
| --- | --- |
| 0 | 5 |
| 0.1 | 44 |
| 0.3 | 52 |
| 0.5 | 80 |
| 1.0 | 93 |
| 5.0 | 95 |

*Example 24*

To sample R of Example 23 was applied a 5% aqueous solution of "Vinacol" alone and also to the same sample was applied the same solution in which had been incorporated 0.5% of "Polymine" P, in both instances the applications being made to a thickness as would yield a 1-micron-thick film upon drying. To these samples, after being dried for 10 minutes at 70° C., were applied further a vinyl chloride-vinyl acetate copolymer solution to a thickness as would yield a 1-micron-thick film upon drying, following which the samples were dried for 3 minutes at 70° C. to yield samples S and T, respectively. These were heat sealed using a 110° C. heat plate and then allowed to stand for 24 hours. Their adhesive forces along with that of the sample which did not receive the application of "Vinacol" were measured, the results of which are shown in Table XX.

Further, the electrifying property of the samples were determined by measuring the voltage generated by means of a given friction using "Statilon" (static charge measuring instrument manufactured by Shishido Company, Japan). These results also are shown in Table XX.

TABLE XX

| Sample | Adhesive Force, g./cm. | Voltage Generated According to Static Charge Measuring Instrument V |
|---|---|---|
| S | 5 | 3,000 |
| T | 96 | 0 |
| U | 93 | 32,000 |

*Example 25*

To sample R of Example 23 were applied 15%, 15% and 20% aqueous solutions of "Vinacol" MH, sodium carboxymethyl cellulose and starch, respectively, each singly and also the respective aqueous solutions in each of which had been incorporated 1.0% of "Polymine" P. Each of the foregoing samples was then laminated with a kraft paper. The adhesive forces obtained are shown in Table XXI.

In all cases, the adhesive force obtained by the use of the water-soluble polymer alone was too low to be of practical use. However, in the case of those in which "Polymine" P was incorporated, the adhesive force was strong and thus they were fully capable of being put to practical use.

TABLE XXI

Polymer: Adhesive force, g./cm.
"Vinacol," singly _____ 6
Sodium carboxy methyl cellulose, singly _____ 2
Starch, singly _____ 2
"Vinacol" plus "Polymine" P >100 kraft paper broke.
"Cellogen" plus "Polymine" P >100 kraft paper broke.
Starch plus "Polymine" P >100 kraft paper broke.

*Example 26*

To sample R of Example 23 were applied 15%, 15% and 20% aqueous solutions of "Vinacol" MH, sodium carboxymethyl cellulose and starch, respectively, each singly and also the respective aqueous solutions in each of which had been incorporated 5% of glue. Then adhesion was effected between each of the similarly coated samples.

After allowing to stand for 48 hours, the adhesive forces obtained were as shown in Table XXII.

In all cases, the adhesive force was low when the water-soluble polymer was used alone but became strong when glue was incorporated. In addition, there was no adherence of dust to the adhered surfaces due to static charge.

TABLE XXII

Polymer: Adhesive force, g./cm.
"Vinacol," singly _____ 4
Sodium carboxymethyl cellulose, singly _____ 1
Starch, singly _____ 1
"Vinacol," plus glue _____ 72
"Cellogen," plus glue _____ 59
Starch, plus glue _____ 61

*Example 27*

22-micron-thick polypropylene films having a PO index of $7.3 \times 10^{-3}$ and an AO index of $5.3 \times 10^{-3}$ were subjected for 15 seconds to corona discharge treatments (gap between electrodes 10 mm., impressed voltage 10, 15 and 20 kv.), following which they were passed through a hexane solution containing 2% tetrapropyl titanate 1% tetrastearyl titanate and then dried for a minute at 80° C. The so obtained three samples, along with that untreated, that receiving the corona discharge treament only and that receiving the titanate treatment only, were each extrusion laminated with 20 micron of "Sumikathene" L–70 (Polyethylene by the high pressure process, manufactured by Sumitomo Chemical Company, Japan) [extrusion temperature 320° C., laminating speed 7 m./min.], and the adhesive force of the polyethylene in each instance was compared. The results obtained are given in Table XXIII.

TABLE XXIII

| Sample | Adhesive Force of Polyethylene, g./cm. | |
|---|---|---|
| | Without Titanate Treatment | With Titanate Treatment |
| Without Corona Discharge Treatment | 4 | <1 |
| With Corona Discharge Treatment: | | |
| 10 kv | 8 | 20 |
| 15 kv | 9 | 35 |
| 20 kv | 9 | 35 |

*Example 28*

The polypropylene film used in Example 27 was treated for 20 seconds with a potassium dichromate mixed liquor (90 parts sulfuric acid, 1 part potassium dichromate and 9 parts water) at 30° C., washed with water and dried. It was then passed through hexane solutions of titanates [2:1 (wt.) tetrapropyl titanate:tetrastearyl titanate] having titanate concentrations of 1, 3 and 10% followed by drying for 2 minutes at 40° C.

When, after carrying out the extrusion lamination as in Example 27, the adhesive force polyethylene was measured, the results obtained were as shown in Table XXIV.

TABLE XXIV

Titanate concentration, percent: Adhesive force of polyethyl, g./cm.
0 _____ 9
1 _____ 25
3 _____ 34
10 _____ 50

*Example 29*

A 20-micron-thick polypropylene film having a PO index of $5.4 \times 10^{-3}$ and an AO index of $3.3 \times 10^{-3}$ (sample V) was treated for 10 seconds with a potassium dichromate mixed liquor (90 parts sulfuric acid, 1 part potassium dichromate and 9 parts water) at 30° C., then washed with water and dried (sample W). To each of the samples V and W were applied a 10% alcohol solution of polyvinyl butyral to a thickness as would yield a 2-micron-thick film upon drying followed by drying for 2 minutes at 80° C. (samples X and Y, respectively). Vacuum deposition of aluminum to a film thickness of 50 millimicron was effected at a vacuum of $5 \times 10^{-4}$ mm. Hg to these samples V, W, X and Y.

The adhesive force of the samples metalized by vacuum deposition was determined as follows:

The foregoing metalized film was coated with a vinyl acetate resin to a film thickness of 5 microns, and after drying for 2 minutes at 80° C., the metalized film was adhered to a polyvinyl chloride sheet employing pressure rolls heated to 100° C., at a film speed of 3 meters per minute. This was cut into samples 1 centimeter wide and the stripping force was measured using the Instron Tensile Tester Model TM–M and a pulling speed of 2 centimeters per minute. The stripping takes place between the biaxially stretched polypropylene film and the polyvinyl butyral resin. The results obtained were as shown in Table XXV, below.

TABLE XXV

| Sample: | Adhesive force of the vapor deposited film g./cm. |
|---|---|
| V | <5 |
| W | <5 |
| X | 10–25 |
| Y | 100–110 |

*Example 30*

Sample V of Example 29 was subjected to a corona discharge treatment (gap between electrodes 5 mm., impressed voltage 20 kilovolts, treatment time 5 minutes). To the treated film were applied various resins to a thickness as would yield 2–3 micron-thick films upon drying followed by drying for 2 minutes. If necessary, further hardening at room temperature was carried out and thereafter the vacuum deposition of aluminum was effected in a vacuum of $5 \times 10^{-4}$ mm. Hg. The adhesive force was measured as in Example 29, the results of which are set forth in Table XXVI.

TABLE XXVI

| Resin: | Stripping force, g./cm. |
|---|---|
| Polyvinyl acetate | 80–100 |
| Polyurethane [1] | 110–130 |
| Epoxy [2] | 100–120 |

[1] "Urethane" A 100 produced by Nippon Oils and Fats, Japan.
[2] "Cemedine" 1500 produced by Cemedine Company, Japan.

What is claimed is:

1. A method of improving the surface properties of a polypropylene film which comprises first stretching a polypropylene film biaxially to orient said film until its planar orientation index becomes not less than about $2 \times 10^{-3}$ and its axial orientation index becomes not over about $10 \times 10^{-3}$ and thereafter subjecting the surface of said film to an oxidation treatment, said planar orientation index and said axial orientation index denotes birefringence expressed as $\frac{1}{2}(\beta+\gamma) - \alpha$ and $\gamma - \beta$, respectively, whereby $\frac{1}{2}(\beta+\gamma) - \alpha$ is the measure of the planar orientation of the film and whereby $-\beta$ is the measure of the equilibrium of the longitudinal and transverse orientations within the film.

2. The method of claim 1 in which the treated surface of said oxidation treated polypropylene film is covered further with a surface reforming material.

3. The method of claim 1, characterized in that subsequent to said oxidation treatment said treated surface is washed with a solution of an amino compound.

4. The method of claim 2 in which said surface reforming material is a thermoplastic resin liquor.

5. The method of claim 2 in which said surface reforming material is a water-soluble polymer containing a substituent selected from the group consisting of amino, hydroxyl, carboxyl and sulfonic groups.

6. The method of claim 2, characterized in that subsequent to said oxidation treatment an alkyl titanate type compound is coated to said treated film and further a thermoplastic resin is extrusion laminated thereto.

7. The method of claim 3 wherein said amino compound is polyethylene imine.

References Cited by the Examiner

UNITED STATES PATENTS

| 2,984,641 | 5/1961 | Wolinski. | |
| 3,076,720 | 2/1963 | Rice et al. | |
| 3,088,844 | 5/1963 | Hungerford et al. | |
| 3,099,572 | 7/1963 | Rion. | |
| 3,111,418 | 11/1963 | Gilbert et al. | 117—68.5 |
| 3,112,199 | 11/1963 | Camerini. | |
| 3,144,430 | 8/1964 | Schaffhausen | 264—289 |

ROBERT F. WHITE, *Primary Examiner.*

ALEXANDER H. BRODMERKEL, *Examiner.*

F. S. WHISENHUNT, *Assistant Examiner.*